(12) United States Patent
Huang

(10) Patent No.: US 10,996,439 B2
(45) Date of Patent: May 4, 2021

(54) IMAGING LENS ASSEMBLY

(71) Applicant: Zhejiang Sunny Optical Co., Ltd, Ningbo (CN)

(72) Inventor: Lin Huang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 160 days.

(21) Appl. No.: 16/224,713

(22) Filed: Dec. 18, 2018

(65) Prior Publication Data

US 2019/0121097 A1    Apr. 25, 2019

Related U.S. Application Data

(63) Continuation of application No. PCT/CN2018/077349, filed on Feb. 27, 2018.

(30) Foreign Application Priority Data

Jul. 31, 2017 (CN) .......................... 201710637489.7
Jul. 31, 2017 (CN) .......................... 201720938617.7

(51) Int. Cl.
*G02B 13/00* (2006.01)
*G02B 9/60* (2006.01)
*G02B 13/06* (2006.01)
*H04N 5/225* (2006.01)
*G02B 13/04* (2006.01)

(52) U.S. Cl.
CPC ........... *G02B 13/0045* (2013.01); *G02B 9/60* (2013.01); *G02B 13/04* (2013.01); *G02B 13/06* (2013.01); *H04N 5/2254* (2013.01)

(58) Field of Classification Search
CPC .... G02B 9/60; G02B 13/0045; G02B 13/002; G02B 13/04; G02B 13/06; G02B 3/02; G02B 3/04; H04N 5/2254
USPC .......................... 359/725, 763, 764, 714, 713
See application file for complete search history.

(56) References Cited

U.S. PATENT DOCUMENTS

| 2013/0002920 A1 | 1/2013 | Sano |
| 2013/0201567 A1 | 8/2013 | Tsai et al. |
| 2013/0201568 A1 | 8/2013 | Tsai et al. |
| 2013/0335835 A1 | 12/2013 | Chang et al. |
| 2015/0015767 A1 | 1/2015 | Lin et al. |

(Continued)

FOREIGN PATENT DOCUMENTS

CN          105319674          2/2016

*Primary Examiner* — Marin Pichler
(74) *Attorney, Agent, or Firm* — Hauptman Ham, LLP

(57) ABSTRACT

The present disclosure discloses an imaging lens assembly. The imaging lens assembly includes sequentially from an object side to an image side: a first lens, having a positive refractive power; a second lens, having a negative refractive power, an object-side surface of the second lens being a convex surface, and an image-side surface of the second lens being a concave surface; a third lens, having a positive refractive power, and an image-side surface of the third lens being a convex surface; a fourth lens, having a refractive power; and a fifth lens, having a refractive power, an object-side surface of the fifth lens being a convex surface. An effective focal length f of the imaging lens assembly and an effective focal length f1 of the first lens satisfy: $5.5<f1/f<25$. The imaging lens assembly has the characteristics of large aperture, high relative brightness, wide angle, and good image quality.

18 Claims, 6 Drawing Sheets

(56) References Cited

U.S. PATENT DOCUMENTS

| | | |
|---|---|---|
| 2016/0097915 A1 | 4/2016 | Chung et al. |
| 2016/0139364 A1 | 5/2016 | Tang et al. |
| 2016/0223797 A1* | 8/2016 | Zhao .................. G02B 13/0045 |
| 2016/0274332 A1 | 9/2016 | Tang et al. |
| 2017/0090158 A1* | 3/2017 | Tang ........................ G02B 9/64 |
| 2017/0227741 A1 | 8/2017 | Dai et al. |

* cited by examiner

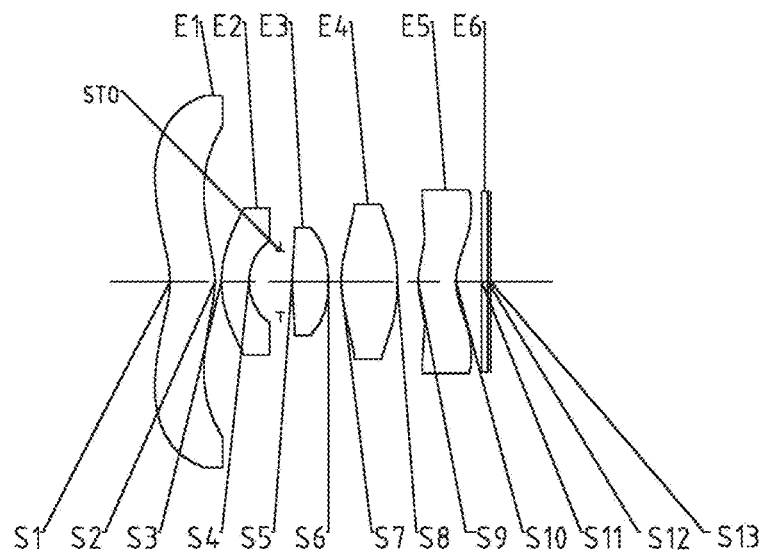
Fig. 26
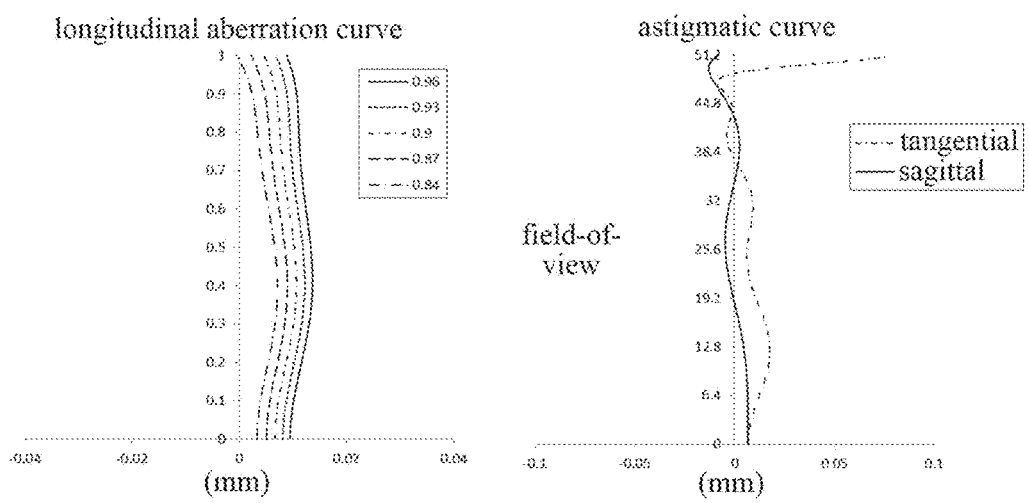
Fig. 27
Fig. 28
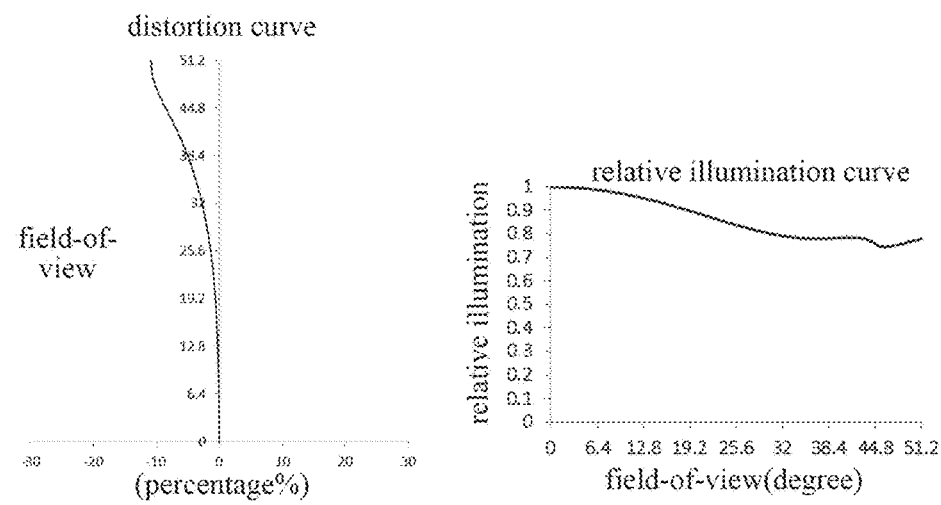
Fig. 29
Fig. 30

IMAGING LENS ASSEMBLY

CROSS-REFERENCE TO RELATED APPLICATIONS

This application is a continuation of International Application. PCT/CN2018/077349, with an international filing date of Feb. 27, 2018, which claims priority to Chinese Patent Application no. 201710637489.7, filed with the China National Intellectual Property Administration (CNIPA) on Jul. 31, 2017, and Chinese Patent Application no. 201720938617.7, filed with the China National Intellectual Property Administration (CNIPA) on Jul. 31, 2017, the contents of which are incorporated herein by reference in their entirety.

TECHNICAL FIELD

The present disclosure relates to an imaging lens assembly, and specifically to a large aperture imaging lens assembly including five lenses.

BACKGROUND

In addition to the development trend of high resolution, modern optical systems continually develop towards a large field-of-view and a large aperture, which can receive more information from the object side. Therefore, large field-of-view and large aperture camera lens assemblies are the trend.

In recent years, higher performance of the camera lens assemblies is required, such as a large field-of-view, a large aperture, high relative brightness, and high image quality, due to the increasing development of portable electronic products. A F-number of an existing lens assembly is typically configured as 2.0 or higher to satisfy the requirements of compact structure and high relative brightness, thereby obtaining the lens assembly having a compact structure and high optical performance. However, even higher performance of the imaging lens assembly is required with the constant development of smart phones and other portable electronic products, especially in the situations in which light is insufficient (e.g., cloudy and rainy days, dusk), or the hand is trembling. The F-number of 2.0 or higher cannot meet the even higher requirements for imaging.

Therefore, the present disclosure provides an optical system applicable to the portable electronic products and having a large aperture, high relative brightness, a wide angle, high image quality, and low sensitivity.

SUMMARY

The present disclosure provides an imaging lens assembly in order to solve at least one problem in the existing technology.

According to an aspect, the present disclosure provides an imaging lens assembly. The imaging lens assembly includes sequentially from an object side to an image side: a first lens, having a positive refractive power; a second lens, having a negative refractive power, an object-side surface of the second lens being a convex surface, and an image-side surface of the second lens being a concave surface; a third lens, having a positive refractive power, and an image-side surface of the third lens being a convex surface; a fourth lens, having a refractive power; and a fifth lens, having a refractive power, and an object-side surface of the fifth lens being a convex surface. An effective focal length f of the imaging lens assembly and an effective focal length f1 of the first lens satisfy: $5.5<f1/f<25$.

According to an implementation of the present disclosure, the effective focal length f of the imaging lens assembly and an entrance pupil diameter EPD of the imaging lens assembly satisfy: $f/EPD \leq 1.6$.

According to an implementation of the present disclosure, an effective radius DT11 of an object-side surface of the first lens and an effective radius DT52 of an image-side surface of the fifth lens satisfy: $1.8<DT11/DT52<2.8$.

According to an implementation of the present disclosure, an effective radius DT11 of an object-side surface of the first lens and half of a diagonal length ImgH of an effective pixel area on an image plane satisfy: $1.3<DT11/ImgH<3$.

According to an implementation of the present disclosure, a combined focal length f12 of the first lens and the second lens and the effective focal length f of the imaging lens assembly satisfy: $-3.5<f12/f<-2.6$.

According to an implementation of the present disclosure, a radius of curvature R3 of the object-side surface of the second lens and a radius of curvature R6 of the image-side surface of the third lens satisfy: $-1.2<R3/R6<-0.5$.

According to an implementation of the present disclosure, at least one surface of the object-side surface and an image-side surface of the first lens has at least one inflection point.

According to an implementation of the present disclosure, the half of the diagonal length ImgH of the effective pixel area on the image plane and the effective focal length f of the imaging lens assembly satisfy: $ImgH/f \leq 1.1$.

According to an implementation of the present disclosure, the effective focal length f1 of the first lens and an effective focal length f3 of the third lens satisfy: $1.5<f1/f3<8$.

According to an implementation of the present disclosure, an effective focal length f3 of the third lens and the effective focal length f of the imaging lens assembly satisfy: $1.4 \leq f3/f<3.8$.

According to an implementation of the present disclosure, an effective radius DT11 of an object-side surface of the first lens and an effective radius DT21 of the object-side surface of the second lens satisfy: $2<DT11/DT21<3.4$.

According to an implementation of the present disclosure, an effective focal length f5 of the fifth lens and the effective focal length f of the imaging lens assembly satisfy: $|f/f5|<0.2$.

According to an implementation of the present disclosure, an infrared band-pass optical filter is disposed between the fifth lens and an image plane.

According to an implementation of the present disclosure, a diaphragm is disposed between the second lens and the third lens.

According to another aspect, the present disclosure provides an imaging lens assembly. The imaging lens assembly includes sequentially from an object side to an image side: a first lens, having a positive refractive power; a second lens, having a negative refractive power, an object-side surface of the second lens being a convex surface, and an image-side surface of the second lens being a concave surface; a third lens, having a positive refractive power, and an image-side surface of the third lens being a convex surface; a fourth lens, having a refractive power; and a fifth lens, having a refractive power, and an object-side surface of the fifth lens being a convex surface. An effective radius DT11 of an object-side surface of the first lens and half of a diagonal length ImgH of an effective pixel area on an image plane satisfy: $1.3<DT11/ImgH<3$.

According to an implementation of the present disclosure, an effective focal length f of the imaging lens assembly and an entrance pupil diameter EPD of the imaging lens assembly satisfy: f/EPD≤1.6.

According to an implementation of the present disclosure, the effective radius DT11 of the object-side surface of the first lens and an effective radius DT52 of an image-side surface of the fifth lens satisfy: 1.8<DT11/DT52<2.8.

According to an implementation of the present disclosure, the effective focal length f of the imaging lens assembly and an effective focal length f1 of the first lens satisfy: 5.5<f1/f<25.

According to an implementation of the present disclosure, a combined focal length f12 of the first lens and the second lens and an effective focal length f of the imaging lens assembly satisfy: −3.5<f12/f<−2.6.

According to an implementation of the present disclosure, a radius of curvature R3 of the object-side surface of the second lens and a radius of curvature R6 of the image-side surface of the third lens satisfy: −1.2<R3/R6<−0.5.

According to an implementation of the present disclosure, at least one surface of the object-side surface and an image-side surface of the first lens has at least one inflection point.

According to an implementation of the present disclosure, the half of the diagonal length ImgH of the effective pixel area on the image plane and the effective focal length f of the imaging lens assembly satisfy: ImgH/f≥1.1.

According to an implementation of the present disclosure, the effective focal length f1 of the first lens and an effective focal length f3 of the third lens satisfy: 1.5<f1/f3<8.

According to an implementation of the present disclosure, an effective focal length f3 of the third lens and the effective focal length f of the imaging lens assembly satisfy: 1.4≤f3/f<3.8.

According to an implementation of the present disclosure, the effective radius DT11 of the object-side surface of the first lens and an effective radius DT21 of the object-side surface of the second lens satisfy: 2<DT11/DT21<3.4.

According to an implementation of the present disclosure, an effective focal length f5 of the fifth lens and an effective focal length f of the imaging lens assembly satisfy: |f/f5|<0.2.

According to an implementation of the present disclosure, an infrared band-pass optical filter is disposed between the fifth lens and the image plane.

According to an implementation of the present disclosure, a diaphragm is disposed between the second lens and the third lens.

According to another aspect, the present disclosure provides an imaging lens assembly. The imaging lens assembly includes sequentially from an object side to an image side: a first lens, having a positive refractive power; a second lens, having a negative refractive power, an object-side surface of the second lens being a convex surface, and an image-side surface of the second lens being a concave surface; a third lens, having a positive refractive power, and an image-side surface of the third lens being a convex surface; a fourth lens, having a refractive power; and a fifth lens, having a refractive power, and an object-side surface of the fifth lens being a convex surface. An effective radius DT11 of an object-side surface of the first lens and an effective radius DT52 of an image-side surface of the fifth lens satisfy: 1.8<DT11/DT52<2.8.

According to another aspect, the present disclosure provides an imaging lens assembly. The imaging lens assembly includes sequentially from an object side to an image side: a first lens, having a positive refractive power; a second lens, having a negative refractive power, an object-side surface of the second lens being a convex surface, and an image-side surface of the second lens being a concave surface; a third lens, having a positive refractive power, and an image-side surface of the third lens being a convex surface; a fourth lens, having a refractive power; and a fifth lens, having a refractive power, and an object-side surface of the fifth lens being a convex surface. A combined focal length f12 of the first lens and the second lens and an effective focal length f of the imaging lens assembly satisfy: −3.5<f12/f<−2.6.

According to another aspect, the present disclosure provides an imaging lens assembly. The imaging lens assembly includes sequentially from an object side to an image side: a first lens, having a positive refractive power; a second lens, having a negative refractive power, an object-side surface of the second lens being a convex surface, and an image-side surface of the second lens being a concave surface; a third lens, having a positive refractive power, and an image-side surface of the third lens being a convex surface; a fourth lens, having a refractive power; and a fifth lens, having a refractive power, and an object-side surface of the fifth lens being a convex surface. An effective radius DT11 of an object-side surface of the first lens and an effective radius DT21 of the object-side surface of the second lens satisfy: 2<DT11/DT21<3.4.

According to another aspect, the present disclosure provides an imaging lens assembly. The imaging lens assembly includes sequentially from an object side to an image side: a first lens, having a positive refractive power; a second lens, having a negative refractive power, an object-side surface of the second lens being a convex surface, and an image-side surface of the second lens being a concave surface; a third lens, having a positive refractive power, and an image-side surface of the third lens being a convex surface; a fourth lens, having a refractive power; and a fifth lens, having a refractive power, and an object-side surface of the fifth lens being a convex surface. An effective focal length f5 of the fifth lens and an effective focal length f of the imaging lens assembly satisfy: |f/f5|<0.2.

The imaging lens assembly according to the present disclosure uses five lenses, and has at least one of the characteristics of a large aperture, high relative brightness, a wide angle, and high image quality.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings:

FIG. 26 is a schematic structural diagram illustrating an imaging lens assembly according to the sixth embodiment; and FIGS. 27-30 respectively illustrate a longitudinal aberration curve, an astigmatic curve, a distortion curve, and a relative illumination curve of the imaging lens assembly according to the sixth embodiment.

DETAILED DESCRIPTION OF EMBODIMENTS

Figure 1:
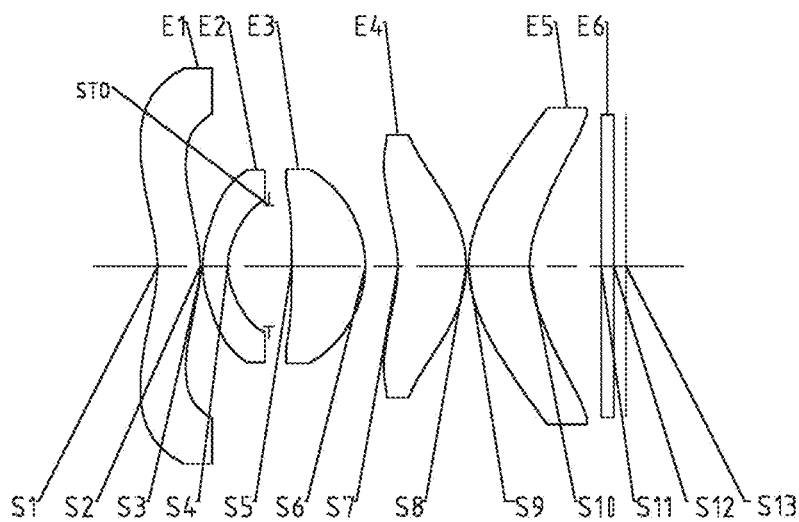
FIG. 1 is a schematic structural diagram illustrating an imaging lens assembly according to the first embodiment.

The present disclosure will be further described in detail below with reference to the accompanying drawings and embodiments. It may be understood that the specific embodiments described herein are merely used to explain the related invention rather than limit the invention. It should also be noted that for the convenience of description, only the parts related to the related invention are shown in the accompanying drawings.

It should be understood that in the present disclosure, an element or layer may be directly on another element or layer, or directly connected to or coupled to another element or layer, or there may be an intervening element or layer, when the element or layer is described as being "on," "connected to," or "coupled to" another element or layer. When an element is referred to as being "directly on," "directly connected to," or "directly coupled to" another element or layer, there are no intervening elements or layers. Throughout the specification, identical reference numerals refer to the same elements. The expression "and/or" used in this text includes any and all combinations of one or more of the associated listed items.

It should be understood that although the terms $1^{st}$, $2^{nd}$ or first, second, etc. may be used herein to describe various elements, components, areas, layers, and/or sections, these elements, components, areas, layers, and/or sections should not be limited by these terms. These terms are only used to distinguish one element, component, area, layer, or section from another element, component, area, layer, or section. Thus, the first element, component, area, layer, or section discussed below may be termed the second element, component, area, layer, or section without departing from the teachings of the present disclosure.

The terminology used herein is for the purpose of describing specific implementations only and is not intended to limit the present disclosure. As used herein, unless explicitly stated otherwise in the context, use of a term in a singular form also encompasses that term in plural form. It should be further understood that the terms "comprising," "including," "having," and variants thereof, when used in this specification, specify the presence of stated features, entireties, steps, operations, elements and/or components, but do not exclude the presence or addition of one or more other features, entireties, steps, operations, elements, components and/or combinations thereof. As used herein, the term "and/or" includes any and all combinations of one or more of the associated listed items. Expressions, such as "at least one of," when preceding a list of elements, modify the entire list of elements rather than the individual element in the list. Further, the use of "may," when describing the implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The present disclosure provides an imaging lens assembly. The imaging lens assembly according to the present disclosure from an object side of the imaging lens assembly to an image side is sequentially provided with: a first lens, a second lens, a third lens, a fourth lens, and a fifth lens.

In the embodiments of the present disclosure, an effective focal length f of the imaging lens assembly and an entrance pupil diameter EPD of the imaging lens assembly satisfy: $f/EPD \leq 1.6$, and the effective focal length f of the imaging lens assembly and an effective focal length f1 of the first lens satisfy: $5.5 < f1/f < 25$, specifically, satisfy: $5.82 \leq f1/f \leq 12.05$. An imaging lens assembly satisfying the above relationship can achieve the effects of wide angle, large aperture, high relative illumination, and high resolution.

In the embodiments of the present disclosure, an effective radius DT11 of an object-side surface of the first lens and an effective radius DT52 of an image-side surface of the fifth lens satisfy: $1.8 < DT11/DT52 < 2.8$, and more specifically, satisfy: $1.86 \leq DT11/DT52 \leq 2.75$. An imaging lens assembly satisfying the above relationship can achieve the effects of wide angle and high relative illumination.

In the embodiments of the present disclosure, the effective radius DT11 of the object-side surface of the first lens and half of a diagonal length ImgH of an effective pixel area on an image plane satisfy: $1.3 < DT11/ImgH < 3$, and more specifically, satisfy: $1.31 \leq DT11/ImgH \leq 2.89$. An imaging lens assembly satisfying the above relationship can achieve the effects of wide angle and high relative illumination.

In the embodiments of the present disclosure, a combined focal length f12 of the first lens and the second lens and the effective focal length f of the imaging lens assembly satisfy: $-3.5 < f12/f < -2.6$, and more specifically, satisfy: $-3.4 \leq f12/f \leq -2.48$. An imaging lens assembly satisfying the above relationship can achieve the effect of wide angle.

In the embodiments of the present disclosure, a radius of curvature R3 of the object-side surface of the second lens and a radius of curvature R6 of the image-side surface of the third lens satisfy: $-1.2 < R3/R6 < -0.5$, and more specifically, satisfy: $-1.1 \leq R3/R6 \leq -0.6$. An imaging lens assembly satisfying the above relationship can achieve the effects of large aperture and high image quality.

In the embodiments of the present disclosure, the effective focal length f1 of the first lens and an effective focal length f3 of the third lens satisfy: 1.5<f1/f3<8, and more specifically, satisfy: 1.6≤f1/f3≤5.02. An imaging lens assembly satisfying the above relationship can achieve the effects of wide angle and high pixel.

In the embodiments of the present disclosure, the half of the diagonal length ImgH of the effective pixel area on the image plane and the effective focal length f of the imaging lens assembly satisfy: ImgH/f≥1.1, and more specifically, satisfy: ImgH/f≥1.11. An imaging lens assembly satisfying the above relationship can achieve the effect of wide angle.

In the embodiments of the present disclosure, the effective focal length f3 of the third lens and the effective focal length f of the imaging lens assembly satisfy: 1.4≤f3/f<3.8, and more specifically, satisfy: 1.421≤f3/f≤3.63. An imaging lens assembly satisfying the above relationship can achieve the effects of high image quality and wide angle.

In the embodiments of the present disclosure, the effective radius DT11 of the object-side surface of the first lens and an effective radius DT21 of the object-side surface of the second lens satisfy: 2<DT11/DT21<3.4, and more specifically, satisfy: 2.06≤DT11/DT21≤3.28. An imaging lens assembly satisfying the above relationship can achieve the effect of wide angle.

In the embodiments of the present disclosure, an effective focal length f5 of the fifth lens and the effective focal length f of the imaging lens assembly satisfy: |f/f5|<0.2, and more specifically, satisfy: |f/f5|≤0.18. An imaging lens assembly satisfying the above relationship can achieve the effect of high relative illumination.

In the embodiments of the present disclosure, an infrared band-pass optical filter is disposed between the fifth lens and the image plane. The infrared waveband contributes to not introducing chromatic aberration into the system and controlling the diffuse spot diameter. At the same time, the infrared waveband contributes to reducing the interference of ambient visible light and improving the signal to noise ratio of the image-side sensor output.

In the embodiments of the present disclosure, at least one surface of the object-side surface and an image-side surface of the first lens has at least one inflection point, which helps reduce the distortion.

The imaging lens assembly according to the first to the sixth embodiments of the present disclosure includes five lenses. These five lenses are respectively a first lens E1 having an object-side surface S1 and an image-side surface S2, a second lens E2 having an object-side surface S3 and an image-side surface S4, a third lens E3 having an object-side surface S5 and an image-side surface S6, a fourth lens E4 having an object-side surface S7 and an image-side surface S8, and a fifth lens E5 having an object-side surface S9 and an image-side surface S10. The first to the fifth lenses E1-E5 are arranged in sequence from an object side to an image side of the imaging lens assembly. The first lens E1 may have a positive refractive power, and at least one surface of the object-side surface and the image-side surface of the first lens has at least one inflection point. The second lens E2 may have a negative refractive power, the object-side surface S3 of the second lens is a convex surface, and the image-side surface S4 of the second lens is a concave surface. The third lens E3 may have a positive refractive power, and the image-side surface S6 of the third lens is a convex surface. The fourth lens E4 may have a positive refractive power. The fifth lens E5 may have a positive refractive power or a negative refractive power. The imaging lens assembly further includes an optical filter E6 having an object-side surface S11 and an image-side surface S12 for filtering infrared light. The imaging lens assembly further includes a diaphragm disposed between the second lens E2 and the third lens E3, in the embodiments, light from an object passes through the surfaces S1 to S12 sequentially and is finally imaged on the image plane S13.

TABLE 1

| parameters | embodiment | | | | | |
| --- | --- | --- | --- | --- | --- | --- |
| | 1 | 2 | 3 | 4 | 5 | 6 |
| ImgH (mm) | 2.47 | 2.47 | 2.47 | 2.47 | 2.47 | 3.01 |
| HFOV (°) | 56.23 | 55.36 | 51.31 | 54.55 | 53.47 | 51.19 |
| f (mm) | 2.20 | 2.18 | 1.99 | 2.19 | 2.12 | 2.71 |
| f1 (mm) | 15.67 | 13.64 | 24.01 | 12.74 | 13.87 | 18.40 |
| f2 (mm) | −5.38 | −4.21 | −5.54 | −4.50 | −4.29 | −5.48 |
| f3 (mm) | 3.13 | 6.55 | 6.16 | 7.95 | 6.18 | 7.86 |
| f4 (mm) | 11.72 | 4.39 | 4.12 | 3.65 | 4.22 | 4.93 |
| f5 (mm) | 12.49 | 18.55 | −94.74 | 630.30 | 12.67 | 34.51 |
| TTL (mm) | 7.67 | 8.50 | 10.49 | 9.08 | 8.14 | 10.71 |

In the embodiments of the present disclosure, the first to the fifth lenses E1 to E5 have their respective effective focal lengths f1 to f5. The first to the fifth lenses E1 to E5 are sequentially arranged along an optical axis and collectively determine the total effective focal length f of the imaging lens assembly. The effective focal lengths f1 to f5 of the first to the fifth lenses E1 to E5, the total effective focal length f of the imaging lens assembly, the total track length TTL of the imaging lens assembly, the half of the maximal field-of-view HFOV of the imaging lens assembly, and the half of the diagonal length ImgH of the effective pixel area on the image plane in the first embodiment to the fifth embodiment may be, for example, those shown in Table 1 above.

The present disclosure is further described in detail below in combination with the specific embodiments.

The First Embodiment

FIG. 1 is a schematic structural diagram illustrating the imaging lens assembly of the first embodiment. As described above and with reference to FIG. 1, the imaging lens assembly according to the first embodiment includes five lenses. The five lenses are respectively the first lens E1 having the object-side surface S1 and the image-side surface S2, the second lens E2 having the object-side surface S3 and the image-side surface S4, the third lens E3 having the object-side surface S5 and the image-side surface S6, the fourth lens E4 having the object-side surface S7 and the image-side surface S8, and the fifth lens E5 having the object-side surface S9 and the image-side surface S10.

Table 2 shows the surface type, the radius of curvature, the thickness, the refractive index, the abbe number, and the conic coefficient of each lens in the imaging lens assembly in this embodiment. The radius of curvature and the thickness are shown in millimeters (mm).

TABLE 2

| surface number | surface type | radius of curvature | thickness | material refractive index | abbe number | conic coefficient |
|---|---|---|---|---|---|---|
| OBJ | spherical | infinite | infinite | | | |
| S1 | aspheric | −2.0173 | 0.6966 | 1.53 | 55.8 | −11.6621 |
| S2 | aspheric | −1.8139 | 0.0363 | | | −12.5743 |
| S3 | aspheric | 1.5941 | 0.4102 | 1.62 | 23.5 | −4.8569 |
| S4 | aspheric | 0.9718 | 0.6786 | | | −3.8558 |
| STO | spherical | infinite | 0.3706 | | | |
| S5 | aspheric | −16174.9841 | 1.2097 | 1.53 | 55.8 | −99.0000 |
| S6 | aspheric | −1.6444 | 0.5327 | | | −0.1620 |
| S7 | aspheric | −1.9661 | 1.1180 | 1.53 | 55.8 | −11.7887 |
| S8 | aspheric | −1.7832 | 0.0300 | | | −0.6817 |
| S9 | aspheric | 1.5386 | 0.9986 | 1.53 | 55.8 | −4.7613 |
| S10 | aspheric | 1.5593 | 1.1768 | | | −2.9206 |
| S11 | spherical | infinite | 0.2100 | 1.51 | 64.2 | |
| S12 | spherical | infinite | 0.1985 | | | |
| S13 | spherical | infinite | | | | |

In this embodiment, the surface type x of each aspheric surface is defined by the below formula (1):

$$x = \frac{ch^2}{1 + \sqrt{1 - (k+1)c^2 h^2}} + \sum A_i h^i \quad (1)$$

Here, x is the sag the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 2 above); k is the conic coefficient (given in Table 2 above); and $A_i$ is the correction coefficient of the $i^{th}$ order of the aspheric surface. Table 3 below shows the higher-order coefficients $A_4$, $A_6$, $A_8$, $A_{10}$, $A_{12}$, $A_{14}$, and $A_{16}$ applicable to the aspheric surfaces S1-S10 of the aspheric lenses in this embodiment.

TABLE 3

| surface number | A4 | A6 | A8 | A10 | A12 | A14 | A16 |
|---|---|---|---|---|---|---|---|
| S1 | −4.9089E−02 | 4.8674E−01 | −4.6896E+00 | 2.5620E+01 | −8.6729E+01 | 1.8321E+02 | −2.3553E+02 |
| S2 | −1.0662E−02 | 2.0801E−02 | −2.8151E+00 | 2.1883E+01 | −1.0415E+02 | 3.0157E+02 | −5.2395E+02 |
| S3 | −2.6526E−01 | 3.2853E−01 | −5.3928E+00 | 4.0465E+01 | −1.9272E+02 | 5.7966E+02 | −1.0628E+03 |
| S4 | −1.8173E−02 | −2.2361E−01 | 2.3298E+00 | −1.5195E+01 | 6.5109E+01 | −1.6769E+02 | 2.5812E+02 |
| S5 | −8.7746E−02 | 2.3830E−02 | 9.9586E−01 | −7.8194E+00 | 3.3087E+01 | −7.9110E+01 | 1.1006E+02 |
| S6 | −2.3238E−01 | 6.3312E−01 | −1.5467E+00 | 3.6129E+00 | −6.1881E+00 | 7.2066E+00 | −5.1493E+00 |
| S7 | −5.8897E−01 | 6.0048E−01 | −3.9682E−01 | 2.0766E−01 | −8.2185E−02 | 2.2711E−02 | −4.0942E−03 |
| S8 | −3.0468E−01 | 3.1884E−01 | −2.4608E−01 | 1.3565E−01 | −5.1678E−02 | 1.3066E−02 | −2.0669E−03 |
| S9 | −3.0468E−01 | 3.1884E−01 | −2.4608E−01 | 1.3565E−01 | −5.1678E−02 | 1.3066E−02 | −2.0669E−03 |
| S10 | −3.0468E−01 | 3.1884E−01 | −2.4608E−01 | 1.3565E−01 | −5.1678E−02 | 1.3066E−02 | −2.0669E−03 |

Figures 2, 3:
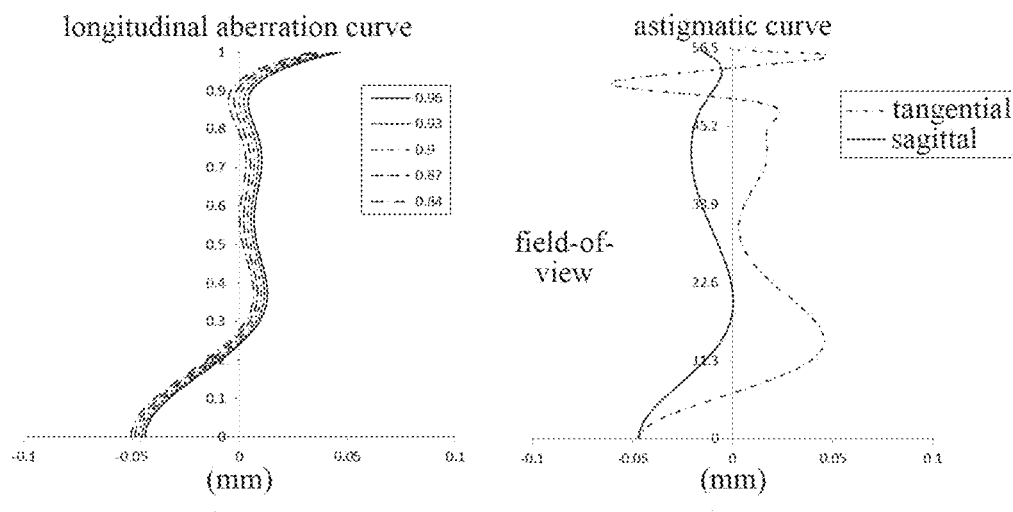
FIGS. 2-5 respectively illustrate a longitudinal aberration curve, an astigmatic curve, a distortion curve, and a relative illumination curve of the imaging lens assembly according to the first embodiment.
Figures 4, 5:
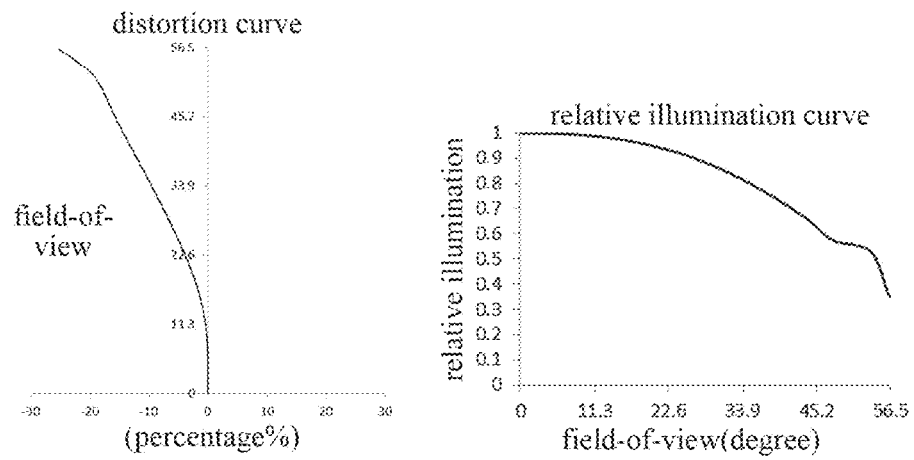

FIG. 2 shows a longitudinal aberration curve of the imaging lens assembly according to the first embodiment, representing deviations of focal points of light of different wavelengths converged after passing through the optical system. FIG. 3 shows an astigmatic curve of the imaging lens assembly according to the first embodiment, representing a curvature of a tangential image plane and a curvature of a sagittal image plane. FIG. 4 shows a distortion curve of the imaging lens assembly according to the first embodiment, representing amounts of distortion at different viewing angles. FIG. 5 shows a relative illumination curve of the imaging lens assembly according to the first embodiment, representing a ratio of peripheral image brightness to center image brightness, reflecting brightness uniformity of the image. In summary and referring to FIG. 2 to FIG. 5, it may be seen that the imaging lens assembly according to the first embodiment is an imaging lens assembly having a large aperture, high relative brightness, a wide angle, and high image quality.

The Second Embodiment

Figure 6:
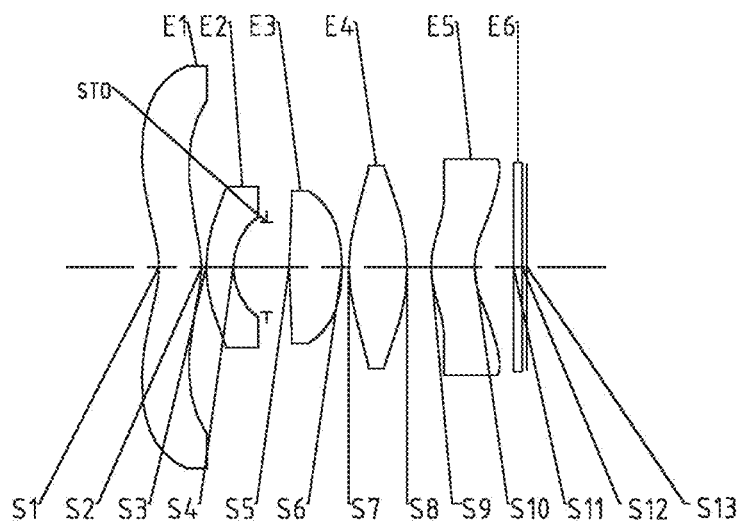
FIG. 6 is a schematic structural diagram illustrating an imaging lens assembly according to the second embodiment.

FIG. 6 is a schematic structural diagram illustrating the imaging lens assembly of the second embodiment. As described above and with reference to FIG. 6, the imaging lens assembly according to the second embodiment includes the first lens E1, the second lens E2, the third lens E3, the fourth lens E4, and the fifth lens E5 in sequence from an object side to an image side.

Table 4 shows the surface type, the radius of curvature, the thickness, the refractive index, the abbe number, and the conic coefficient of each lens in the imaging lens assembly in this embodiment. The radius of curvature and the thickness are shown in millimeters (mm).

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | −2.3373 | 1.0210 | 1.53 | 55.8 | −8.2837 |
| S2 | aspheric | −2.0289 | 0.1104 | | | −14.5563 |

TABLE 4-continued

| surface number | surface type | radius of curvature | thickness | refractive index | abbe number | conic coefficient |
|---|---|---|---|---|---|---|
| S3 | aspheric | 3.4698 | 0.6458 | 1.62 | 23.5 | 1.2441 |
| S4 | aspheric | 1.3824 | 0.8009 | | | 0.0156 |
| STO | spherical | infinite | 0.5421 | | | |
| S5 | aspheric | 11.9613 | 1.2676 | 1.53 | 55.8 | 3.9689 |
| S6 | aspheric | −4.6623 | 0.1583 | | | 3.9839 |
| S7 | aspheric | 3.3498 | 1.4003 | 1.53 | 55.8 | −6.1902 |
| S8 | aspheric | −6.3859 | 0.5733 | | | 0.8792 |
| S9 | aspheric | 1.8592 | 1.0404 | 1.53 | 55.8 | −0.8903 |
| S10 | aspheric | 1.8534 | 0.9387 | | | −1.9598 |
| S11 | spherical | infinite | 0.2100 | 1.51 | 64.2 | |
| S12 | spherical | infinite | 0.1103 | | | |
| S13 | spherical | infinite | | | | |

Table 5 below shows the higher-order coefficients $A_4$, $A_6$, $A_8$, $A_{10}$, $A_{12}$, $A_{14}$, and $A_{16}$ applicable to the aspheric surfaces S1-S10 of the aspheric lenses in this embodiment. Here, the surface types of the aspheric surfaces may be defined by the formula (1) given above in the first embodiment.

TABLE 5

| surface number | A4 | A6 | A8 | A10 | A12 | A14 | A16 |
|---|---|---|---|---|---|---|---|
| S1 | 1.3444E−02 | −2.1683E−03 | 2.6176E−04 | −2.0196E−05 | 9.4504E−07 | −2.4285E−08 | 2.6692E−10 |
| S2 | 1.4391E−02 | −3.1393E−03 | 5.7988E−04 | −7.1213E−05 | 5.2216E−06 | −2.0165E−07 | 3.1301E−09 |
| S3 | 3.3415E−02 | −6.8953E−02 | 5.2354E−02 | −2.3181E−02 | 5.9166E−03 | −8.1041E−04 | 4.5750E−05 |
| S4 | −1.4153E−01 | 2.4727E−01 | −4.6011E−01 | 6.1033E−01 | −4.9301E−01 | 2.1376E−01 | −3.7935E−02 |
| S5 | −1.1570E−03 | −5.7705E−03 | 3.3514E−03 | −1.5279E−03 | 4.0230E−04 | −4.4255E−05 | 3.2768E−07 |
| S6 | −4.2088E−02 | 1.4316E−02 | −6.5834E−03 | 1.8045E−03 | −2.6685E−04 | 7.5067E−06 | 1.7583E−06 |
| S7 | −1.5253E−02 | 1.1563E−02 | −5.6169E−03 | 1.6007E−03 | −2.5882E−04 | 2.1654E−05 | −7.2460E−07 |
| S8 | −4.0492E−02 | 2.3683E−02 | −8.3671E−03 | 1.9269E−03 | −2.5104E−04 | 1.5829E−05 | −3.4332E−07 |
| S9 | −7.6142E−02 | 1.5510E−02 | −1.0099E−02 | 4.3318E−03 | −9.0325E−04 | 9.2739E−05 | −3.8153E−06 |
| S10 | 8.3394E−03 | −3.1734E−02 | 1.5169E−02 | −4.1147E−03 | 6.6814E−04 | −5.8466E−05 | 2.0611E−06 |

Figures 7, 8:
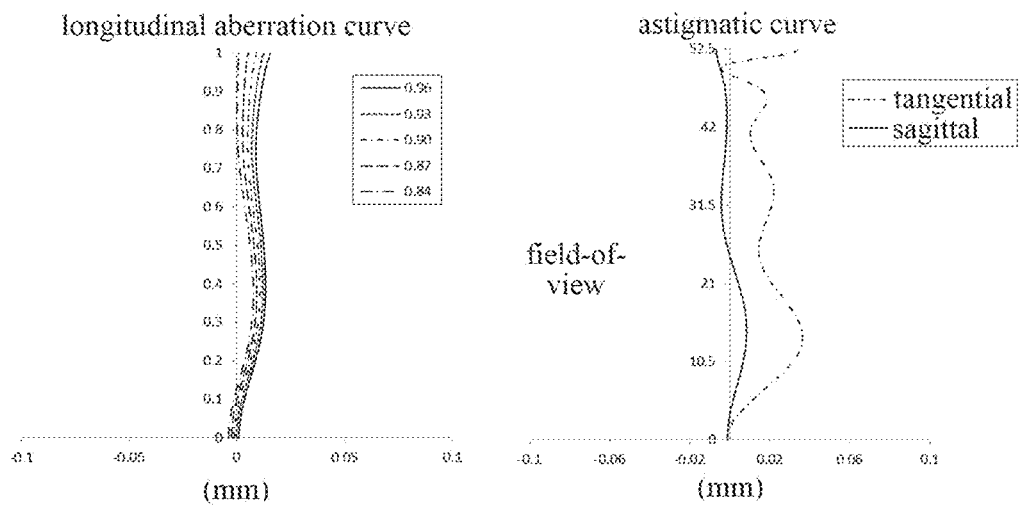
FIGS. 7-10 respectively illustrate a longitudinal aberration curve, an astigmatic curve, a distortion curve, and a relative illumination curve of the imaging lens assembly according to the second embodiment.
Figures 9, 10:
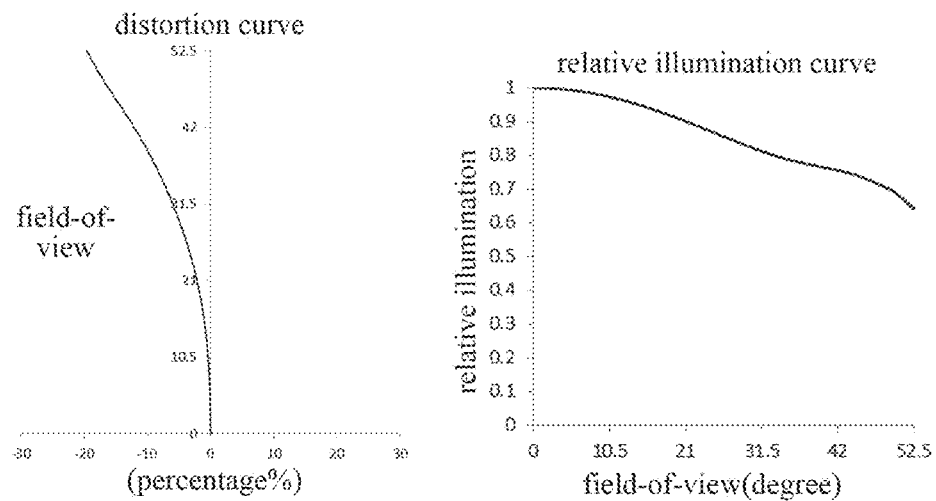

FIG. 7 shows a longitudinal aberration curve of the imaging lens assembly according to the second embodiment, representing deviations of focal points of light of different wavelengths converged after passing through the optical system. FIG. 8 shows an astigmatic curve of the imaging lens assembly according to the second embodiment, representing a curvature of a tangential image plane and a curvature of a sagittal image plane. FIG. 9 shows a distortion curve of the imaging lens assembly according to the second embodiment, representing amounts of distortion at different viewing angles. FIG. 10 shows a relative illumination curve of the imaging lens assembly according to the second embodiment, representing a ratio of peripheral image brightness to center image brightness, reflecting brightness uniformity of the image. In summary and referring to FIG. 7 to FIG. 10, it may be seen that the imaging lens assembly according to the second embodiment is an imaging lens assembly having a large aperture, high relative brightness, a wide angle, and hi n image quality.

The Third Embodiment

Figure 11:
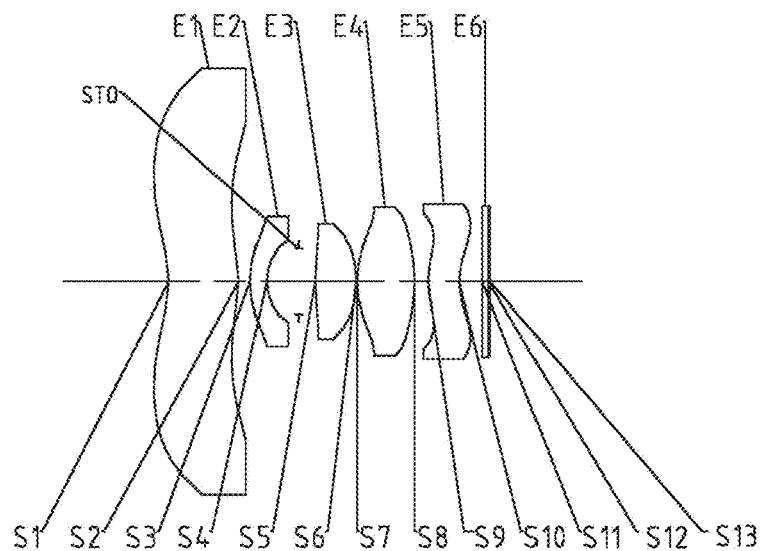
FIG. 11 is a schematic structural diagram illustrating an imaging lens assembly according to the third embodiment.

FIG. 11 is a schematic structural diagram illustrating the imaging lens assembly of the third embodiment. As described above and with reference to FIG. 11, the imaging lens assembly includes the first lens E1, the second lens E2, the third lens E3, the fourth lens E4, and the fifth lens E5 in sequence from an object side to an image side.

Table 6 shows the surface type, the radius of curvature, the thickness, the refractive index, the abbe number, and the conic coefficient of each lens in the imaging lens assembly in this embodiment. The radius of curvature and the thickness are shown in millimeters (mm).

TABLE 6

| surface number | surface type | radius of curvature | thickness | refractive index | abbe number | conic coefficient |
|---|---|---|---|---|---|---|
| OBJ | spherical | infinite | infinite | | | |
| S1 | aspheric | −3.4658 | 2.3442 | 1.53 | 55.8 | −9.7891 |
| S2 | aspheric | −3.3541 | 0.3797 | | | −21.2100 |
| S3 | aspheric | 3.8379 | 0.5462 | 1.62 | 23.5 | 1.1923 |
| S4 | aspheric | 1.7122 | 1.0712 | | | −0.1651 |
| STO | spherical | infinite | 0.5483 | | | |
| S5 | aspheric | 11.4503 | 1.3724 | 1.53 | 55.8 | −3.9023 |
| S6 | aspheric | −4.3354 | 0.0300 | | | 2.6267 |
| S7 | aspheric | 3.1870 | 1.9324 | 1.53 | 55.8 | −3.4794 |
| S8 | aspheric | −5.3530 | 0.4478 | | | −12.0140 |
| S9 | aspheric | 2.6936 | 1.0386 | 1.62 | 23.5 | −1.8745 |
| S10 | aspheric | 2.1958 | 0.7756 | | | −3.5188 |
| S11 | spherical | infinite | 0.2100 | 1.51 | 64.2 | |
| S12 | spherical | infinite | 0.0549 | | | |
| S13 | spherical | infinite | | | | |

Table 7 below shows the higher-order coefficients $A_4$, $A_6$, $A_8$, $A_{10}$, $A_{12}$, $A_{14}$, and $A_{16}$ applicable to the aspheric surfaces S1-S10 of the aspheric lenses in this embodiment. Here, the surface types of the aspheric surfaces may be defined by the formula (1) given above in the first embodiment.

TABLE 7

| surface number | A4 | A6 | A8 | A10 | A12 | A14 | A16 |
|---|---|---|---|---|---|---|---|
| S1 | 3.9878E−03 | −2.2125E−04 | 9.1487E−06 | −2.4679E−07 | 4.1969E−09 | −3.9470E−11 | 1.5242E−13 |
| S2 | 9.1988E−03 | −1.2003E−03 | 1.0237E−04 | −5.3700E−06 | 1.6807E−07 | −2.9078E−09 | 2.1521E−11 |
| S3 | 5.4197E−03 | −9.4525E−03 | 3.9457E−03 | −1.0650E−03 | 1.5893E−04 | −1.3346E−05 | 4.6780E−07 |
| S4 | −4.8952E−02 | 7.3165E−02 | −7.0543E−02 | 5.1403E−02 | −2.0970E−02 | 4.8084E−03 | −4.5752E−04 |
| S5 | 4.0860E−03 | −5.4065E−03 | 2.2594E−03 | −6.3322E−04 | 1.0293E−04 | −9.0134E−06 | 3.0913E−07 |
| S6 | −2.0377E−02 | 9.6595E−04 | 9.9352E−04 | −6.9453E−04 | 2.0110E−04 | −2.6801E−05 | 1.4101E−06 |
| S7 | −3.2453E−03 | 2.6154E−03 | −7.5611E−04 | 9.8857E−05 | −1.0732E−05 | 3.4432E−07 | −5.9364E−09 |
| S8 | −1.1613E−02 | 6.9425E−03 | −1.6759E−03 | 1.4598E−04 | −7.3967E−06 | 3.3301E−07 | −4.6936E−09 |
| S9 | −4.0872E−02 | 1.1774E−03 | −4.5816E−04 | 1.3441E−04 | −1.4359E−05 | 5.7535E−07 | −9.2178E−09 |
| S10 | −5.1639E−03 | −6.7735E−03 | 1.5011E−03 | −1.8255E−04 | 1.2650E−05 | −4.8401E−07 | 7.5549E−09 |

Figure 12:
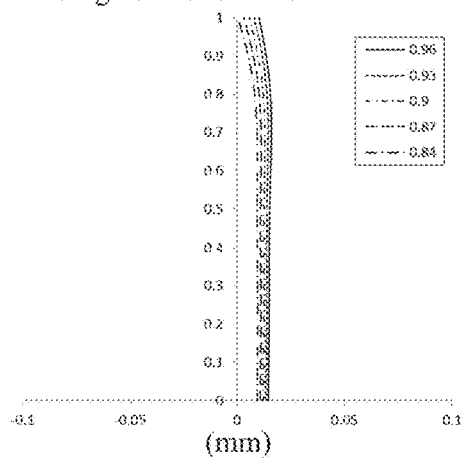
FIGS. 12-15 respectively illustrate a longitudinal aberration curve, an astigmatic curve, a distortion curve, and a relative illumination curve of the imaging lens assembly according to the third embodiment.
Figure 13:
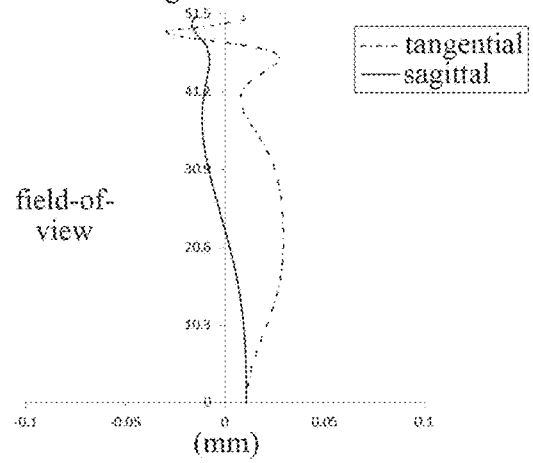
Figure 14:
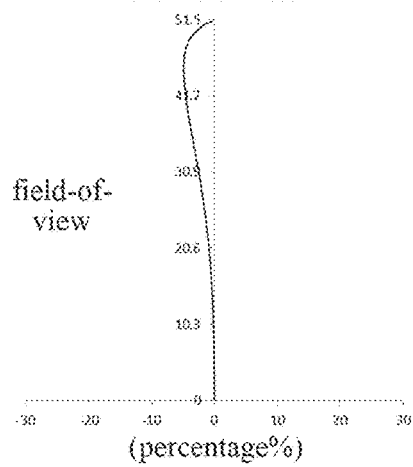
Figure 15:
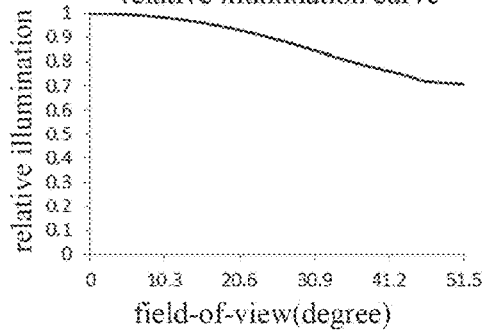

FIG. 12 shows a longitudinal aberration curve of the imaging lens assembly according to the third embodiment, representing deviations of focal points of light of different wavelengths converged after passing through the optical system. FIG. 13 shows an astigmatic curve of the imaging lens assembly according to the third embodiment, representing a curvature of a tangential image plane and a curvature of a sagittal image plane. FIG. 14 shows a distortion curve of the imaging lens assembly according to the third embodiment, representing amounts of distortion at different viewing angles. FIG. 15 shows a relative illumination curve of the imaging lens assembly according to the third embodiment, representing a ratio of peripheral image brightness to center image brightness, reflecting brightness uniformity of the image. In summary and referring to FIG. 12 to FIG. 15, it may be seen that the imaging lens assembly according to the third embodiment is an imaging lens assembly having a large aperture, high relative brightness, a wide angle, and high image quality.

The Fourth Embodiment

Figure 16:
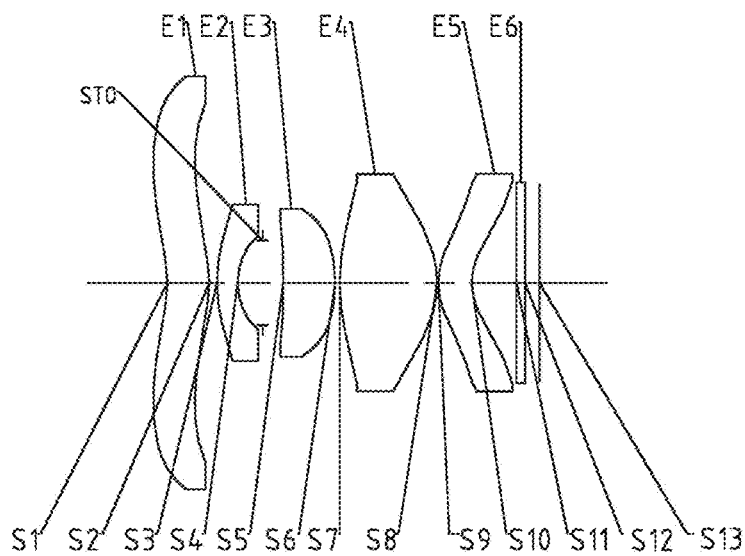
FIG. 16 is a schematic structural diagram illustrating an imaging lens assembly according to the fourth embodiment.

FIG. 16 is a schematic structural diagram illustrating the imaging lens assembly of the fourth embodiment. As described above and with reference to FIG. 16, the imaging lens assembly according to the fourth embodiment includes the first lens E1, the second lens E2, the third lens E3, the fourth lens E4, and the fifth lens E5 in sequence from an object side to an image side.

Table 8 below shows the surface type, the radius of curvature, the thickness, the refractive index, the abbe number, and the conic coefficient of each lens in the imaging lens assembly in this embodiment. The radius of curvature and the thickness are shown in millimeters (mm).

TABLE 8

| surface number | surface type | radius of curvature | thickness | material refractive index | abbe number | conic coefficient |
|---|---|---|---|---|---|---|
| OBJ | spherical | infinite | infinite | | | |
| S1 | aspheric | −3.0178 | 1.0254 | 1.53 | 55.8 | −12.3472 |
| S2 | aspheric | −2.3250 | 0.1872 | | | −19.0583 |
| S3 | aspheric | 4.4880 | 0.5000 | 1.53 | 55.8 | 3.4834 |
| S4 | aspheric | 1.4897 | 0.6124 | | | −0.2546 |
| STO | spherical | infinite | 0.4984 | | | |
| S5 | aspheric | −163.6047 | 1.2704 | 1.53 | 55.8 | −99.0000 |
| S6 | aspheric | −4.0920 | 0.1113 | | | 2.4926 |
| S7 | aspheric | 5.1862 | 2.3778 | 1.53 | 55.8 | −4.1795 |
| S8 | aspheric | −2.5638 | 0.0300 | | | −1.4485 |
| S9 | aspheric | 1.7808 | 0.8141 | 1.62 | 23.5 | −0.8164 |
| S10 | aspheric | 1.4765 | 1.0924 | | | −1.7193 |
| S11 | spherical | infinite | 0.2100 | 1.51 | 64.2 | |
| S12 | spherical | infinite | 0.3499 | | | |
| S13 | spherical | infinite | | | | |

Table 9 below shows the higher-order coefficients $A_4$, $A_6$, $A_8$, $A_{10}$, $A_{12}$, $A_{14}$, and $A_{16}$ applicable to the aspheric surfaces S1-S10 of the aspheric lenses in this embodiment. Here, the surface types of the aspheric surfaces may be defined by the formula (1) given above in the first embodiment.

TABLE 9

| surface number | A4 | A6 | A8 | A10 | A12 | A14 | A16 |
|---|---|---|---|---|---|---|---|
| S1 | 1.0156E−02 | −1.4977E−03 | 1.4820E−04 | −8.8274E−06 | 3.0248E−07 | −5.2620E−09 | 3.4787E−11 |
| S2 | 9.7091E−03 | −2.4556E−03 | 4.2540E−04 | −4.4346E−05 | 2.6869E−06 | −8.6024E−08 | 1.1185E−09 |
| S3 | 5.0675E−02 | −1.0399E−01 | 8.5904E−02 | −4.1348E−02 | 1.1657E−02 | −1.7798E−03 | 1.1218E−04 |
| S4 | −9.8009E−02 | 2.2559E−01 | −5.4619E−01 | 9.2848E−01 | −9.0115E−01 | 4.6089E−01 | −9.5070E−02 |
| S5 | −4.8695E−03 | −1.9755E−02 | 2.5941E−02 | −2.1526E−02 | 1.0056E−02 | −2.2828E−03 | 1.9711E−04 |
| S6 | −3.5884E−03 | −2.7430E−02 | 2.0257E−02 | −1.1456E−02 | 4.3734E−03 | −9.7333E−04 | 9.1202E−05 |
| S7 | 1.3251E−02 | −1.7221E−02 | 7.7291E−03 | −1.9590E−03 | 2.9088E−04 | −2.2677E−05 | 6.8497E−07 |
| S8 | −1.3452E−02 | 1.5465E−02 | −7.7917E−03 | 2.2246E−03 | −3.6746E−04 | 3.3340E−05 | −1.2833E−06 |
| S9 | −3.2401E−02 | 9.3521E−03 | −7.0611E−03 | 2.0442E−03 | −2.8026E−04 | 1.8974E−05 | −5.1376E−07 |
| S10 | 9.3496E−03 | −1.3000E−02 | 2.1260E−03 | −2.3146E−05 | −3.4319E−05 | 4.8825E−06 | −2.1859E−07 |

Figure 17:
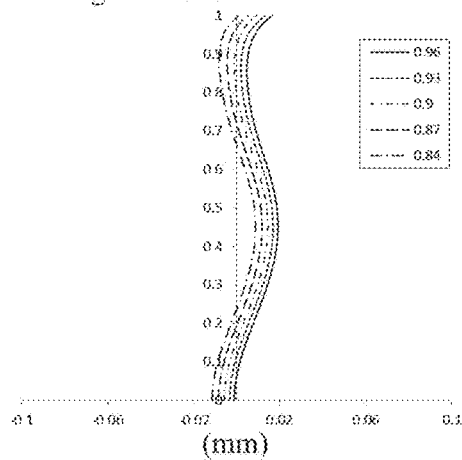
FIGS. 17-20 respectively illustrate a longitudinal aberration curve, an astigmatic curve, a distortion curve, and a relative illumination curve of the imaging lens assembly according to the fourth embodiment.
Figure 18:
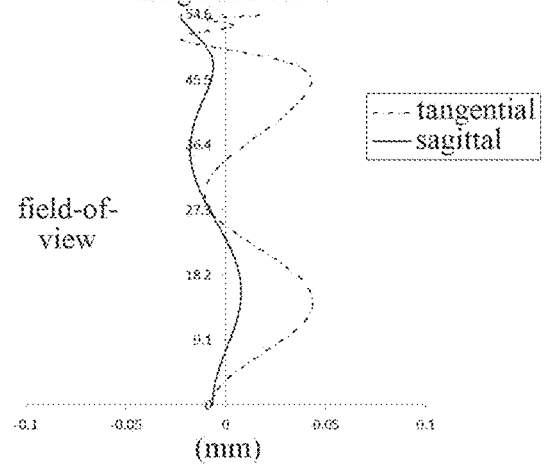
Figure 19:
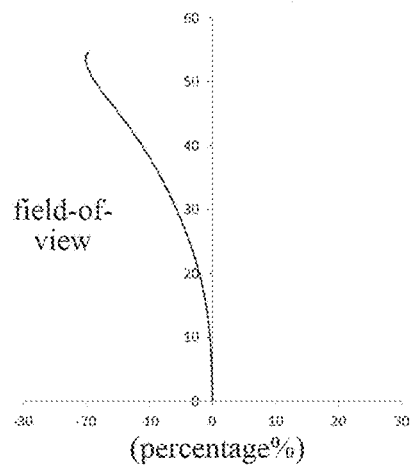
Figure 20:
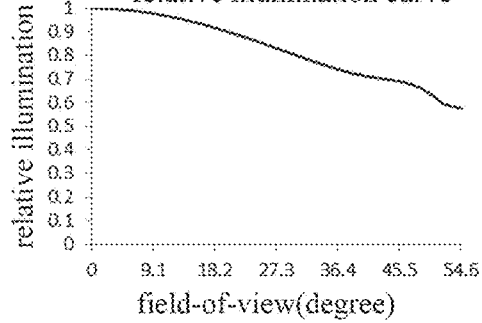

FIG. 17 shows a longitudinal aberration curve of the imaging lens assembly according to the fourth embodiment, representing deviations of focal points of light of different wavelengths converged after passing through the optical system. FIG. 18 shows an astigmatic curve of the imaging lens assembly according to the fourth embodiment, representing a curvature of a tangential image plane and a curvature of a sagittal image plane. FIG. 19 shows a distortion curve of the imaging lens assembly according to the fourth embodiment, representing amounts of distortion at different viewing angles. FIG. 20 shows a relative illumination curve of the imaging lens assembly according to the fourth embodiment, representing a ratio of peripheral image brightness to center image brightness, reflecting brightness uniformity of the image. In summary and referring to FIG. 17 to FIG. 20, it may be seen that the imaging lens assembly according to the fourth embodiment is an imaging lens assembly having a large aperture, high relative brightness, a wide angle, and high image quality.

The Fifth Embodiment

Figure 21:
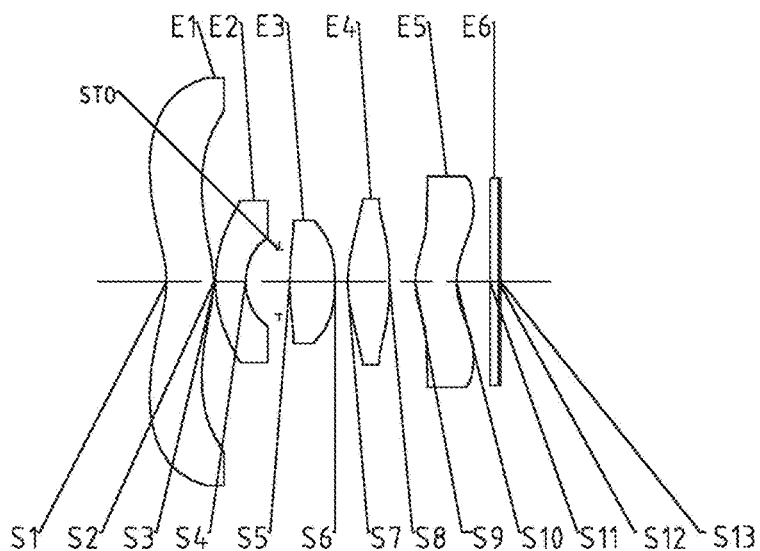
FIG. 21 is a schematic structural diagram illustrating an imaging lens assembly according to the fifth embodiment.

FIG. 21 is a schematic structural diagram illustrating the imaging lens assembly of the fifth embodiment. As described above and with reference to FIG. 21, the imaging lens assembly according to the fifth embodiment includes the first lens E1, the second lens E2, the third lens E3, the fourth lens E4, and the fifth lens E5 in sequence from an object side to an image side.

Table 10 below shows the surface type, the radius of curvature, the thickness, the refractive index, the abbe number, and the conic coefficient of each lens in the imaging lens assembly in this embodiment. The radius of curvature and the thickness are shown in millimeters (mm).

TABLE 10

| surface number | surface type | radius of curvature | thick-ness | material refractive index | abbe number | conic coefficient |
|---|---|---|---|---|---|---|
| OBJ | spherical | infinite | infinite | | | |
| S1 | aspheric | −2.3704 | 1.1541 | 1.53 | 55.8 | −8.4479 |
| S2 | aspheric | −2.0899 | 0.0300 | | | −13.9470 |
| S3 | aspheric | 3.2468 | 0.7376 | 1.62 | 23.5 | 1.2088 |
| S4 | aspheric | 1.3327 | 0.8224 | | | 0.2149 |
| STO | spherical | infinite | 0.2586 | | | |

TABLE 10-continued

| surface number | surface type | radius of curvature | thick-ness | material refractive index | abbe number | conic coefficient |
|---|---|---|---|---|---|---|
| S5 | aspheric | 7.6889 | 1.1034 | 1.53 | 55.8 | 8.9909 |
| S6 | aspheric | −5.3517 | 0.3021 | | | 5.1776 |
| S7 | aspheric | 2.5357 | 1.0270 | 1.53 | 55.8 | −7.2595 |
| S8 | aspheric | −15.4365 | 0.6247 | | | 9.0595 |
| S9 | aspheric | 1.6267 | 1.0031 | 1.53 | 55.8 | −0.8742 |
| S10 | aspheric | 1.6939 | 0.8181 | | | −2.3662 |
| S11 | spherical | infinite | 0.2100 | 1.51 | 64.2 | |
| S12 | spherical | infinite | 0.0500 | | | |
| S13 | spherical | infinite | | | | |

Table 11 below shows the higher-order coefficients $A_4$, $A_6$, $A_8$, $A_{10}$, $A_{12}$, $A_{14}$, and $A_{16}$ applicable to the aspheric surfaces S1-S10 of the aspheric lenses in this embodiment. Here, the surface types of the aspheric surfaces may be defined by the formula (1) given above in the first embodiment.

TABLE 11

| surface number | A4 | A6 | A8 | A10 | A12 | A14 | A16 |
|---|---|---|---|---|---|---|---|
| S1 | 1.2707E−02 | −1.9511E−03 | 2.2354E−04 | −1.6499E−05 | 7.5069E−07 | −1.9038E−08 | 2.0878E−10 |
| S2 | 1.5174E−02 | −3.1832E−03 | 5.3507E−04 | −5.9884E−05 | 4.1174E−06 | −1.5277E−07 | 2.3078E−09 |
| S3 | 1.2690E−02 | −3.2960E−02 | 2.5731E−02 | −1.1304E−02 | 2.7434E−03 | −3.5229E−04 | 1.7918E−05 |
| S4 | −1.6970E−01 | 3.3129E−01 | −5.9784E−01 | 8.0103E−01 | −6.6950E−01 | 2.9886E−01 | −5.3808E−02 |
| S5 | −1.0676E−02 | 7.6670E−03 | −1.6177E−02 | 1.6991E−02 | −8.5129E−03 | 2.0034E−03 | −1.7996E−04 |
| S6 | −8.8309E−02 | 3.7772E−02 | −1.6240E−02 | −3.3808E−04 | 2.9500E−03 | −8.8405E−04 | 7.9929E−05 |
| S7 | −2.4350E−02 | 2.1144E−02 | −1.2339E−02 | 4.0102E−03 | −7.2379E−04 | 6.7526E−05 | −2.5316E−06 |
| S8 | −7.7622E−02 | 5.1981E−02 | −2.2034E−02 | 6.3112E−03 | −1.0535E−03 | 9.1247E−05 | −3.1842E−06 |
| S9 | −1.1137E−01 | 1.7140E−02 | −1.0223E−02 | 6.4028E−03 | −1.7771E−03 | 2.3058E−04 | −1.1685E−05 |
| S10 | 3.1667E−03 | −4.1313E−02 | 2.1930E−02 | −6.4894E−03 | 1.1313E−03 | −1.0496E−04 | 3.9159E−06 |

Figures 22, 23:
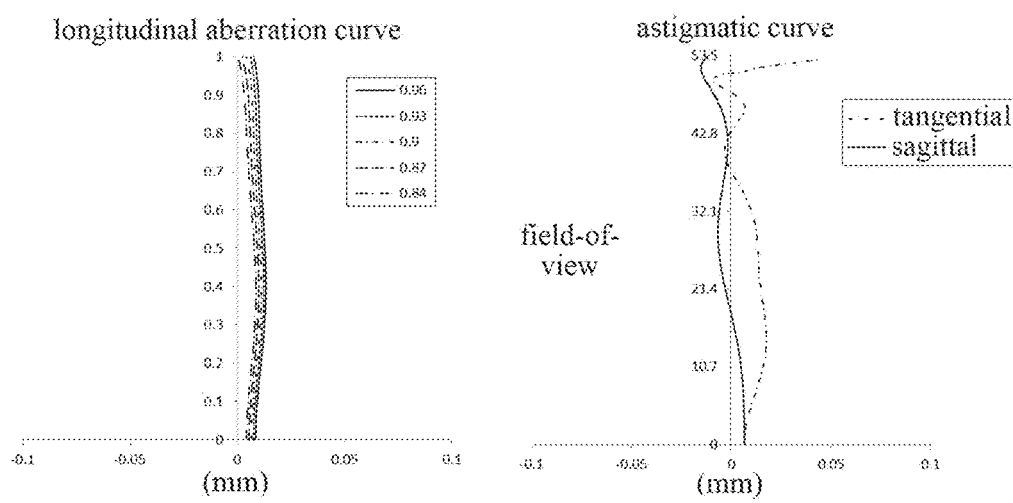
FIGS. 22-25 respectively illustrate a longitudinal aberration curve, an astigmatic curve, a distortion curve, and a relative illumination curve of the imaging lens assembly according to the fifth embodiment.
Figures 24, 25:
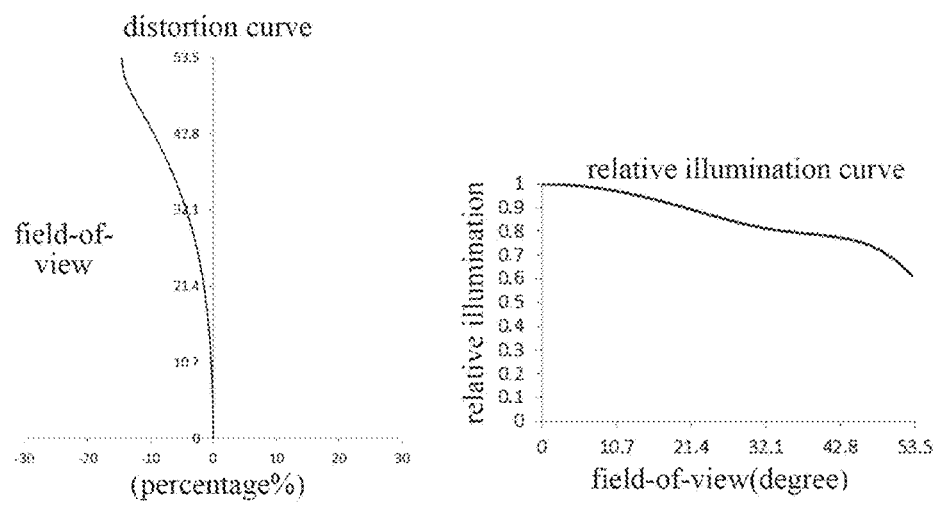

FIG. 22 shows a longitudinal aberration curve of the imaging lens assembly according to the fifth embodiment, representing deviations of focal points of light of different wavelengths converged after passing through the optical system. FIG. 23 shows an astigmatic curve of the imaging lens assembly according to the fifth embodiment, representing a curvature of a tangential image plane and a curvature of a sagittal image plane. FIG. 24 shows a distortion curve of the imaging lens assembly according to the fifth embodiment, representing amounts of distortion at different viewing angles. FIG. 25 shows a relative illumination curve of the imaging lens assembly according to the fifth embodiment, representing a ratio of peripheral image brightness to center image brightness, reflecting brightness uniformity of the image. In summary and referring to FIG. 22 to FIG. 25, it may be seen that the imaging lens assembly according to the fifth embodiment is an imaging lens assembly having a large aperture, high relative brightness, a wide angle, and high image quality.

The Sixth Embodiment

FIG. 26 is a schematic structural diagram illustrating the imaging lens assembly of the sixth embodiment. As described above and with reference to FIG. 26, the imaging lens assembly according to the sixth embodiment includes the first lens E1, the second lens E2, the third lens E3, the fourth lens E4, and the fifth lens E5 in sequence from an object side to an image side.

Table 12 below shows the surface type, the radius of curvature, the thickness, the refractive index, the abbe number, and the conic coefficient of each lens in the imaging lens assembly in this embodiment. The radius of curvature and the thickness are shown in millimeters (mm).

TABLE 12

| surface number | surface type | radius of curvature | thickness | material refractive index | abbe number | conic coefficient |
|---|---|---|---|---|---|---|
| OBJ | spherical | infinite | infinite | | | |
| S1 | aspheric | −3.1636 | 1.5088 | 1.53 | 55.8 | −8.3275 |
| S2 | aspheric | −2.7766 | 0.2011 | | | −13.6091 |
| S3 | aspheric | 3.9558 | 0.9187 | 1.62 | 23.5 | 1.1901 |
| S4 | aspheric | 1.6632 | 1.0515 | | | 0.2038 |
| STO | spherical | infinite | 0.3892 | | | |
| S5 | aspheric | 10.3352 | 1.2191 | 1.53 | 55.8 | 7.8001 |
| S6 | aspheric | −6.6093 | 0.4154 | | | 5.8371 |
| S7 | aspheric | 3.0231 | 1.8903 | 1.53 | 55.8 | −8.1015 |
| S8 | aspheric | −14.2687 | 0.6928 | | | 23.1813 |
| S9 | aspheric | 2.3210 | 1.2657 | 1.62 | 23.5 | −0.8392 |
| S10 | aspheric | 2.0614 | 0.8545 | | | −1.9615 |
| S11 | spherical | infinite | 0.2100 | 1.51 | 64.2 | |
| S12 | spherical | infinite | 0.0921 | | | |
| S13 | spherical | infinite | | | | |

Table 13 below shows the higher-order coefficients $A_4$, $A_6$, $A_8$, $A_{10}$, $A_{12}$, $A_{14}$, and $A_{16}$ applicable to the aspheric surfaces S1-S10 of the aspheric lenses in this embodiment. Here, the surface types of the aspheric surfaces may be defined by the formula (1) given above in the first embodiment.

TABLE 13

| surface number | A4 | A6 | A8 | A10 | A12 | A14 | A16 |
|---|---|---|---|---|---|---|---|
| S1 | 6.2659E−03 | −5.9802E−04 | 4.2501E−05 | −1.9293E−06 | 5.4198E−08 | −8.5643E−10 | 5.9122E−12 |
| S2 | 7.3792E−03 | −1.0189E−03 | 1.1126E−04 | −7.6866E−06 | 3.1636E−07 | −6.9773E−09 | 6.2871E−11 |
| S3 | 1.3749E−02 | −1.5143E−02 | 6.4321E−03 | −1.6159E−03 | 2.2106E−04 | −1.5090E−05 | 3.4670E−07 |
| S4 | −6.1876E−02 | 7.6986E−02 | −1.1055E−01 | 1.1076E−01 | −6.5856E−02 | 2.0040E−02 | −2.3824E−03 |
| S5 | −7.5171E−03 | 4.5988E−03 | −5.2098E−03 | 3.1366E−03 | −9.6631E−04 | 1.4611E−04 | −8.6597E−06 |
| S6 | −5.2585E−02 | 1.9331E−02 | −7.4046E−03 | 1.5242E−03 | −1.0935E−04 | −6.4066E−06 | 9.2434E−07 |
| S7 | −1.0349E−02 | 5.2755E−03 | −2.1270E−03 | 4.7350E−04 | −5.6499E−05 | 3.3914E−06 | −8.0435E−08 |
| S8 | −4.4764E−02 | 1.7924E−02 | −4.7375E−03 | 8.4271E−04 | −8.6118E−05 | 4.5183E−06 | −9.4324E−08 |
| S9 | −6.2792E−02 | 4.6520E−03 | −8.8900E−04 | 5.5959E−04 | −1.1964E−04 | 1.0970E−05 | −3.8216E−07 |
| S10 | −1.9007E−02 | −7.5421E−03 | 4.3545E−03 | −1.0907E−03 | 1.4769E−04 | −1.0150E−05 | 2.7401E−07 |

FIG. 27 shows a longitudinal aberration curve of the imaging lens assembly according to the sixth embodiment, representing deviations of focal points of light of different wavelengths converged after passing through the optical system. FIG. 28 shows an astigmatic curve of the imaging lens assembly according to the sixth embodiment, representing a curvature of a tangential image plane and a curvature of a sagittal image plane. FIG. 29 shows a distortion curve of the imaging lens assembly according to the sixth embodiment, representing amounts of distortion at different viewing angles. FIG. 30 shows a relative illumination curve of the imaging lens assembly according to the sixth embodiment, representing a ratio of peripheral image brightness to center image brightness, reflecting brightness uniformity of the image. In summary and referring to FIG. 27 to FIG. 30, it may be seen that the imaging lens assembly according to the sixth embodiment is an imaging lens assembly having a large aperture, high relative brightness, a wide angle, and high image quality.

To sum up, in the above first to the sixth embodiments, the conditional expressions satisfy the conditions shown in Table 14 below.

TABLE 14

| conditional expression | Embodiment | | | | | |
| | 1 | 2 | 3 | 4 | 5 | 6 |
|---|---|---|---|---|---|---|
| f/EPD | 1.20 | 1.20 | 1.20 | 1.20 | 1.60 | 1.55 |
| f1/f | 7.11 | 6.25 | 12.05 | 5.82 | 6.55 | 6.80 |
| DT11/DT52 | 2.08 | 1.86 | 2.75 | 2.05 | 1.93 | 2.03 |
| DT11/ImgH | 1.31 | 1.95 | 2.89 | 2.03 | 2.01 | 2.07 |
| f12/f | −3.40 | −2.48 | −2.90 | −2.89 | −2.56 | −2.55 |
| R3/R6 | −0.97 | −0.74 | −0.89 | −1.10 | −0.61 | −0.60 |
| f1/f3 | 5.02 | 2.08 | 3.90 | 1.60 | 2.25 | 2.34 |
| ImgH/f | 1.12 | 1.13 | 1.24 | 1.13 | 1.16 | 1.11 |
| f3/f | 1.42 | 3.00 | 3.09 | 3.63 | 2.91 | 2.90 |
| DT11/DT21 | 2.06 | 2.50 | 3.28 | 2.64 | 2.51 | 2.54 |
| |f/f5| | 0.18 | 0.12 | 0.02 | 0.00 | 0.17 | 0.08 |

The foregoing is only a description of the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to) technical features with similar functions.

What is claimed is:

1. An imaging lens assembly, comprising sequentially, from an object side to an image side:

a first lens, having a positive refractive power;

a second lens, having a refractive power, an object-side surface of the second lens being a convex surface, and an image-side surface of the second lens being a concave surface;

a third lens, having a positive refractive power, and an image-side surface of the third lens being a convex surface;

a fourth lens, having a refractive power; and a fifth lens, having a refractive power, and an object-side surface of the fifth lens being a convex surface;

wherein an effective focal length f of the imaging lens assembly and an effective focal length f1 of the first lens satisfy: 5.5<f1/f<25, wherein an effective radius DT11 of an object-side surface of the first lens and half of a diagonal length ImgH of an effective pixel area on an image plane satisfy: 1.3<DT11/ImgH<3, wherein the effective radius DT11 of the object-side surface of the first lens and an effective radius DT21 of the object-side surface of the second lens satisfy: 2<DT11/DT21<3.4, and wherein the imaging lens assembly has only five lenses having refractive power.

2. The imaging lens assembly according to claim 1, wherein a combined focal length f12 of the first lens and the second lens and the effective focal length f of the imaging lens assembly satisfy: −3.5<f12/f<−2.6.

3. The imaging lens assembly according to claim 2, wherein a radius of curvature R3 of the object-side surface of the second lens and a radius of curvature R6 of the image-side surface of the third lens satisfy: −1.2<R3/R6<−0.5.

4. The imaging lens assembly according to claim 3, wherein at least one surface of the object-side surface and an image-side surface of the first lens has at least one inflection point.

5. The imaging lens assembly according to claim 3, wherein the half of the diagonal length ImgH of the effective pixel area on the image plane and the effective focal length f of the imaging lens assembly satisfy: ImgH/f≥1.1.

6. The imaging lens assembly according to claim 3, wherein the effective focal length f1 of the first lens and an effective focal length f3 of the third lens satisfy: 1.5<f1/f3<8.

7. The imaging lens assembly according to claim 3, wherein an effective focal length f3 of the third lens and the effective focal length f of the imaging lens assembly satisfy: 1.4≤f3/f<3.8.

8. The imaging lens assembly according to claim 1, wherein an effective focal length f5 of the fifth lens and the effective focal length f of the imaging lens assembly satisfy: |f/f5|<0.2.

9. The imaging lens assembly according to claim 8, wherein an infrared band-pass optical filter is disposed between the fifth lens and an image plane.

10. The imaging lens assembly according to claim 8, wherein a diaphragm is disposed between the second lens and the third lens.

11. An imaging lens assembly, comprising sequentially, from an object side to an image side:

a first lens, having a positive refractive power;
a second lens, having a refractive power, an object-side surface of the second lens being a convex surface, and an image-side surface of the second lens being a concave surface;
a third lens, having a positive refractive power, and an image-side surface of the third lens being a convex surface;
a fourth lens, having a refractive power; and
a fifth lens, having a refractive power, and an object-side surface of the fifth lens being a convex surface;
wherein an effective radius DT11 of an object-side surface of the first lens and half of a diagonal length ImgH of an effective pixel area on an image plane satisfy: 1.3<DT11/ImgH<3,
wherein a radius of curvature R3 of the object-side surface of the second lens and a radius of curvature R6 of the image-side surface of the third lens satisfy: −1.2<R3/R6<−0.5, and
wherein the imaging lens assembly has only five lenses having refractive power.

12. The imaging lens assembly according to claim 11, wherein an effective focal length f of the imaging lens assembly and an entrance pupil diameter EPD of the imaging lens assembly satisfy: f/EPD≤1.6.

13. The imaging lens assembly according to claim 11, wherein the effective radius DT11 of the object-side surface of the first lens and an effective radius DT52 of an image-side surface of the fifth lens satisfy: 1.8<DT11/DT52<2.8.

14. The imaging lens assembly according to claim 11, wherein a combined focal length f12 of the first lens and the second lens and an effective focal length f of the imaging lens assembly satisfy: −3.5<f12/f<−2.6.

15. The imaging lens assembly according to claim 11, wherein the effective focal length f1 of the first lens and an effective focal length f3 of the third lens satisfy: 1.5<f1/f3<8.

16. The imaging lens assembly according to claim 11, wherein an effective focal length f3 of the third lens and the effective focal length f of the imaging lens assembly satisfy: 1.4≤f3/f<3.8.

17. The imaging lens assembly according to claim 11, wherein the effective radius DT11 of the object-side surface of the first lens and an effective radius DT21 of the object-side surface of the second lens satisfy: 2<DT11/DT21<3.4.

18. The imaging lens assembly according to claim 17, wherein an effective focal length f5 of the fifth lens and an effective focal length f of the imaging lens assembly satisfy: |f/f5|<0.2.

* * * * *